United States Patent [19]
Pan

[11] Patent Number: 5,864,643
[45] Date of Patent: Jan. 26, 1999

[54] MINIATURE 1XN ELECTROMECHANICAL OPTICAL SWITCH AND VARIABLE ATTENUATOR

[75] Inventor: Jing-Jong Pan, Milpitas, Calif.

[73] Assignee: E-Tek Dynamics, Inc., San Jose, Calif.

[21] Appl. No.: 771,603

[22] Filed: Dec. 20, 1996

[51] Int. Cl.[6] .................................................. G02B 6/26
[52] U.S. Cl. ........................ 385/33; 385/15; 385/16; 385/17; 385/24; 385/52; 385/140
[58] Field of Search ................................ 385/16, 17, 20, 385/21, 22, 24, 42, 88, 89, 15, 140

[56] References Cited

U.S. PATENT DOCUMENTS

| | | | |
|---|---|---|---|
| 4,193,662 | 3/1980 | Hara | 383/21 X |
| 4,239,332 | 12/1980 | Inbar | 385/22 X |
| 4,290,667 | 9/1981 | Chown | 385/22 X |
| 4,303,302 | 12/1981 | Ramsey et al. | 385/22 X |
| 4,378,144 | 3/1983 | Duck et al. | 385/22 X |
| 4,420,219 | 12/1983 | Muchel | 385/22 X |
| 4,611,885 | 9/1986 | Boirat | 385/22 X |
| 4,641,915 | 2/1987 | Asakawa et al. | 385/22 X |
| 4,651,343 | 3/1987 | Laor | 385/22 X |
| 4,657,339 | 4/1987 | Fick | 385/22 X |
| 4,818,052 | 4/1989 | Le Pesant et al. | 385/22 X |
| 4,834,488 | 5/1989 | Lee | 385/21 X |
| 4,896,935 | 1/1990 | Lee | 385/22 X |
| 4,961,622 | 10/1990 | Gorman et al. | 385/22 X |
| 5,214,727 | 5/1993 | Carr et al. | 385/22 |
| 5,359,683 | 10/1994 | Pan | 385/22 |
| 5,420,946 | 5/1995 | Tsai | 385/22 |
| 5,446,810 | 8/1995 | Watanabe et al. | 385/22 |
| 5,461,683 | 10/1995 | Harman | 385/21 |
| 5,479,541 | 12/1995 | Pan | 385/22 |
| 5,611,009 | 3/1997 | Pan | 385/22 |
| 5,699,463 | 12/1997 | Yang et al. | 385/22 |

OTHER PUBLICATIONS

Syms et al., *Optical Guided Waves and Devices*, McGraw–Hill Book Co., London, 1992, pp. 189–191.

*Primary Examiner*—Brian Healy
*Attorney, Agent, or Firm*—Townsend and Townsend and Crew LLP

[57] ABSTRACT

The present invention provides for a miniature 1XN electromechanical optical switch which has an array of the end sections of output optical fibers, an end section of an input optical fiber and an actuator to effect a relative movement of the input optical fiber end section with respect to the output optical fiber end sections to form an optical path between the input optical fiber and a selected output optical fiber. An alignment controller controls the relative movement by the actuator through an electric current. The alignment controller effects a coarse alignment between the input optical fiber end section and the end section of the selected output optical fiber dependent upon the proportionality between the relative movement amount and the amount of electric current. A fine alignment between the input optical fiber end section and the end section of the selected output optical fiber is effected by the alignment controller responsive to a feedback signal dependent upon alignment of the input optical fiber end with the end section of the selected output optical fiber.

19 Claims, 5 Drawing Sheets

MINIATURE 1XN ELECTROMECHANICAL OPTICAL SWITCH AND VARIABLE ATTENUATOR

BACKGROUND OF THE INVENTION

The present invention is related to the field of optical switches and, more particularly, to optical switches in which the switching function is effected by electromechanical devices.

In a 1XN optical switch, a single optical fiber forms an optical path with an optical fiber selected from N optical fibers. Thus a signal on the single optical fiber is transmitted to the selected fiber. Similarly a signal on the selected fiber is passed to the single optical fiber. A switch allows the optical connection to be changed from the selected fiber to another of the N fibers.

In electromechanical 1XN optical switches, the switching operation is effected by the movement of an end of the single optical fiber relative to the ends of the N optical fibers. To form an optical path, the end of the single optical fiber is aligned with the end of the selected fiber from the N fibers. In such systems alignment of the fiber ends is critical and much precision is required with the electromechanical drive devices, such as motors and their movements, to ensure accurate and reproducible alignment of the single fiber with each of the N optical fibers. Nonetheless, performance of such switches has remained poor with use restricted to multimode optical fibers. In present day optical networks it is often desirable to use single mode optical fibers.

A successful optical switch is disclosed in U.S. Pat. No. 5,359,683, which issued Oct. 25, 1994 and assigned to the present assignee. In this design GRIN lenses ameliorate the precise requirements of a mechanical alignment between optical fiber ends. Nonetheless, the disclosed optical switches are fairly expensive to manufacture. Stepper motors are required with GRIN lenses for each of the optical fibers in the switch and the size of the optical switch is relatively large which makes easy installation and hermetic sealing of the switch difficult.

The present invention addresses these shortcomings with a 1XN electromechanical optical switch which has not only high optical performance, but which is manufactured with relatively simple elements. The optical switch also is miniaturized for easy installation, easy hermetic sealing and resistance against shock.

SUMMARY OF THE INVENTION

The present invention provides for a miniature 1XN electromechanical optical switch having an array of the end sections of first optical fibers, an end section of a second optical fiber, an actuator effecting a relative movement of the second optical fiber end section with respect to the first optical fiber end sections, and an alignment controller controlling the relative movement by the actuator through an electric current. The amount of relative movement is directly proportional to the amount of electric current. When the end section of the second optical fiber is aligned with an end section of any one of the first optical fibers, an optical path is formed between the second optical fiber and the first optical fiber. The alignment controller effects a coarse alignment between the second optical fiber end section and the end section of a selected first optical fiber dependent upon the proportionality between the relative movement amount and the electric current amount. A fine alignment between the second optical fiber end section and the end section of the selected first optical fiber is effected by the alignment controller responsive to a feedback signal dependent upon alignment of the second optical fiber end with the end section of the selected first optical fiber.

The feedback signal may be generated in two ways. In the first way, the end section of a third optical fiber is fixed to the end section of the second optical fiber such that an alignment of the third optical fiber end section with an end section of a first optical fiber aligns the end section of the second optical fiber with an end section of another first optical fiber. A light source is connected to the third input optical fiber and light signals are transmitted through the third input optical fiber. A detector is also connected to the third input optical fiber to receive light signals reflected back into the third input optical fiber. The detector generates a feedback signal responsive to the reflected light signals which correspond to the amount of alignment between the third optical fiber and a first optical fiber (and between the second optical fiber and the other first optical fiber).

In the second way, a first set of parallel conductive plates are fixed relative to the array of first optical fibers and a second set of parallel conductive plates are fixed relative to the second optical fiber. The first and second sets of conductive plates are interdigitated with respect to each other. The actuator effects a relative movement between the first and second sets of conductive plates as the actuator effects the relative movement of the second optical fiber with respect to the first optical fibers. A detector connected to the first and second sets of conductive plates generates the feedback signal which is responsive to the capacitive coupling corresponding to the relative position between the first and second sets of conductive plates.

DETAILED DESCRIPTION OF SPECIFIC EMBODIMENTS

Figure 1:
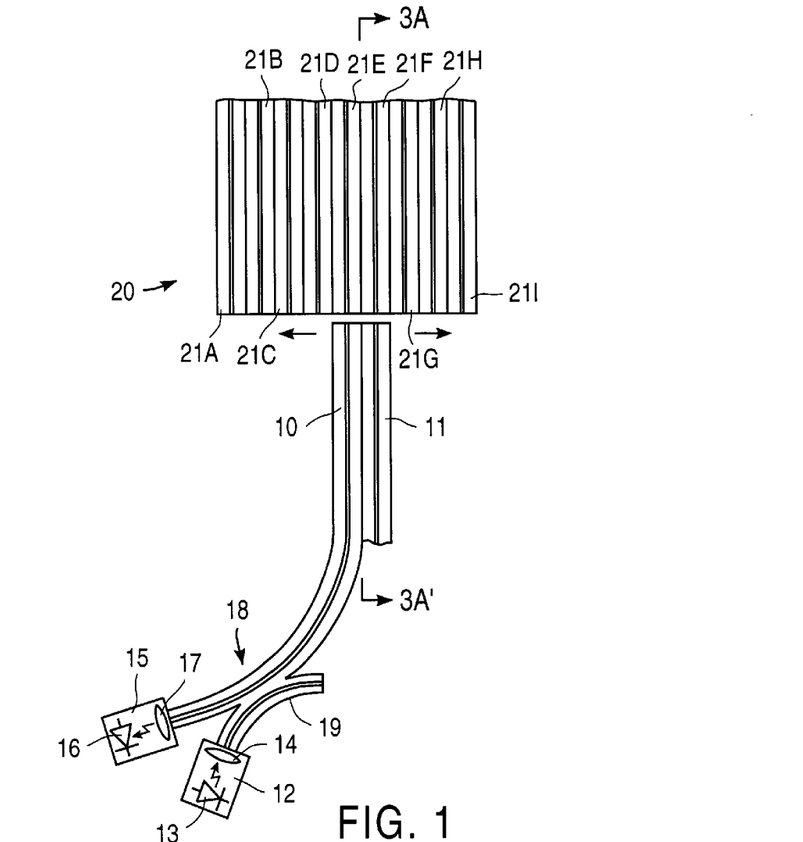
FIG. 1 is a representative top view of a portion of a 1XN electromechanical optical switch according to one embodiment of the present invention.

FIG. 1 illustrates a portion of the 1XN optical switch according to the present invention. The optical switch has an linear array 20 of output optical fibers 21A–21I, which are aligned parallel to each other. The ends of each of these fibers 21A–21I are also aligned. Opposite the array 20 are two fibers, an input fiber 11 and an alignment fiber 10. These two fibers are aligned parallel to each other and parallel to the output optical fibers 21A–21I. The ends of these two fibers 10 and 11 face the ends of the output optical fibers 21A–21I. The opposite end (not shown) of the input optical fiber 11 is coupled to an optical signal source, such as a laser diode, for transmission to a selected output fiber 21A–21I (or, if the transmission direction is reversed, an optical signal receiver for receiving signals from a selected output fiber). Likewise, the opposite ends (not shown) of these fibers 21A–21I are coupled to optical signal receivers, such as a photo detectors, to receive signals from the input optical fiber 11.

Switching is performed by moving the input optical fiber 11 in the plane of the array 20 before the ends of the fibers 21A–21I. The opposite pointing arrows next to the optical fibers 10 and 11 in FIG. 1 illustrate this motion. For precise alignment of the input optical fiber 11 with one of the fibers 21A–21I of the array 20, the alignment fiber 10 has the same alignment relationship with the input fiber 11 as the output optical fibers 21A–21I have with each other. Stated more succinctly, the cores of the fibers 10 and 11 are spaced apart the same distance as the cores of the output fibers 21A–21I are spaced apart.

A light source 12, which is connected to an optical fiber 19, is coupled to the alignment optical fiber 10 by a "3 dB" optical coupler 18. Such couplers are typically formed by twisting together the unjacketed cladding of two optical fibers and heating the fibers as the ends of the fibers are pulled apart. In this particular embodiment, the light source 12 is formed by a light-emitting diode 13 and a lens 14 which focusses the light from the diode 13 into the core of the fiber 19. Half of the light from the diode 13 is sent into the alignment fiber 10 through the coupler 18.

The end of the alignment fiber 10 is connected to a light receiver 15 formed by a silicon photodetector 16 and a lens 17. The lens 17 focusses light received by the alignment fiber 10 onto the photodetector 16.

When the core of the alignment fiber 10 and the core of one of the output fibers 21A–21I are properly aligned, light sent from the light source 12 down the core of the optical fiber 10 is transmitted to the core of one of the optical fibers 21A–21I. If the core of the alignment fiber 10 and the core of one of the fibers 21A–21I are not properly aligned, the light from the source 12 is reflected back at least partially into the core of the alignment fiber 10. The reflected light is focused by the lens 17 onto the photodiode 15. The signal generated by the photodiode 16 is used to align the alignment fiber 10. Since, as shown in FIG. 1, the input fiber 11 is fixed to the side of the optical fiber 10, alignment of the fiber 10 aligns the input fiber 11 to another output optical fiber 21A–21I. The signal from the photodiode 16 provides for precise feedback control of the position of the input fiber 11. When the photodiode signal is at a minimum, alignment is complete.

Figure 2A:
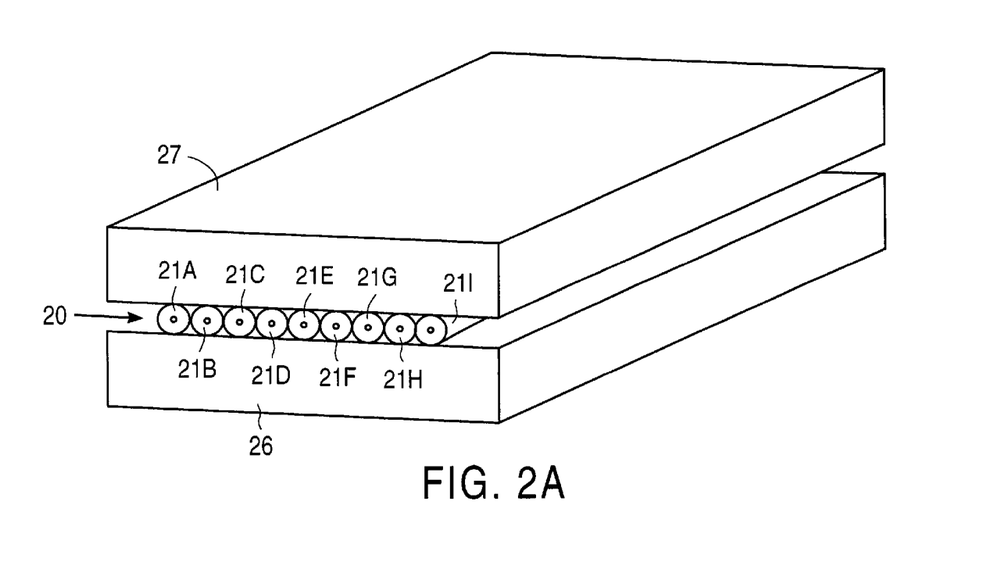
FIG. 2A is a perspective drawing of the output fiber array of the optical switch portion of FIG. 1.

FIG. 2A illustrates details of the array 20. While nine output fibers 21A–21I are shown, it should be understood that more, or less, optical fibers can be used in the array 20. Furthermore, from the operation of the alignment fiber 10 described above, there should be N+1 optical fibers in the array 20 to create an 1XN optical switch.

As shown in FIG. 2, the unjacketed output fibers 21A–21I are placed against each other in a plane between two glass plates 26 and 27. The diameter of the cladding of typical optical fibers is typically 125 $\mu$m so that the cores of the fibers 21A–21I are spaced 125 $\mu$m apart, i.e., the pitch of the array 20 is 125 $\mu$m. The fibers 21A–21I are preferably single-mode fibers so the core diameters of the fibers 21A–21I (and input and alignment fibers 11 and 10) range from 4 to 10 $\mu$m. The ends of the fibers 21A–21I are cut and polished to render the end surfaces of these fibers perpendicular to the longitudinal axes of these optical fibers. The ends of the input fiber 11 and alignment fiber 12 are similarly treated.

Figure 3A:
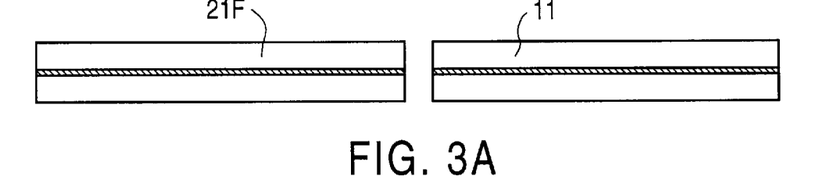
FIG. 3A is a cross-sectional side of the FIG. 1 optical switch view along line 3A–3A'.

FIG. 3A is a cross-sectional view of the output fiber 21F and input fiber 11 along line 3A–3A' of FIG. 1. FIG. 3A illustrates the planar alignment of the output fibers 21A–21I and the input fiber 11 and alignment fiber 10.

Figure 3B:
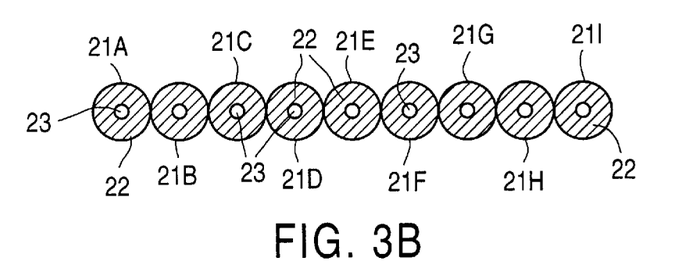
FIG. 3B is a cross-sectional view of the end surfaces of the output optical fibers of FIG. 1.
Figure 3C:
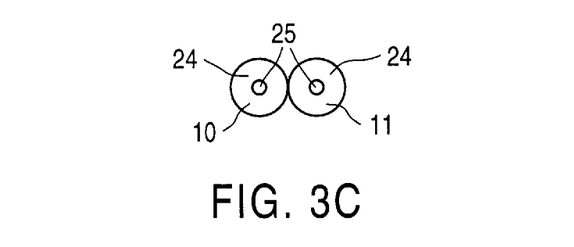
FIG. 3C is a cross-sectional view of the end surfaces of the input optical fibers of FIG. 1.

FIG. 3B is an end view of the end surfaces of the output optical fibers 21A–21I. The shaded portion 22 indicates the end surface over the cladding of each fiber 21A–21I, which is covered by a coating of high reflectivity material, such as gold. The shaded portion encircles the central portion of each end surface, which is the core end surface 23. The core end surface 23 of each fiber 21A–21I is covered with antireflecting material. Likewise, as shown in FIG. 3C, the cladding end surfaces 24 and core end surfaces 25 of the input fiber 11 and alignment fiber 10 are covered with antireflection material. Techniques for depositing high reflectivity materials on the cladding end surfaces may be found in U.S. Pat. No. 5,546,486, which issued Aug. 13, 1996 to Ming Shih et al. and assigned to the present assignee.

The antireflection material over the core end surfaces 25 of the fibers 10 and 11 and the core end surfaces 23 of the output optical fibers 21A–21I facilitate the transmission of light between the cores of these optical fibers. On the other hand, the highly reflecting material on the cladding end surfaces 22 of the optical fibers 21A–21I facilitate the reflection of light from the core of the alignment fiber 10 back into the core of that fiber, as explained previously.

Figure 2B:
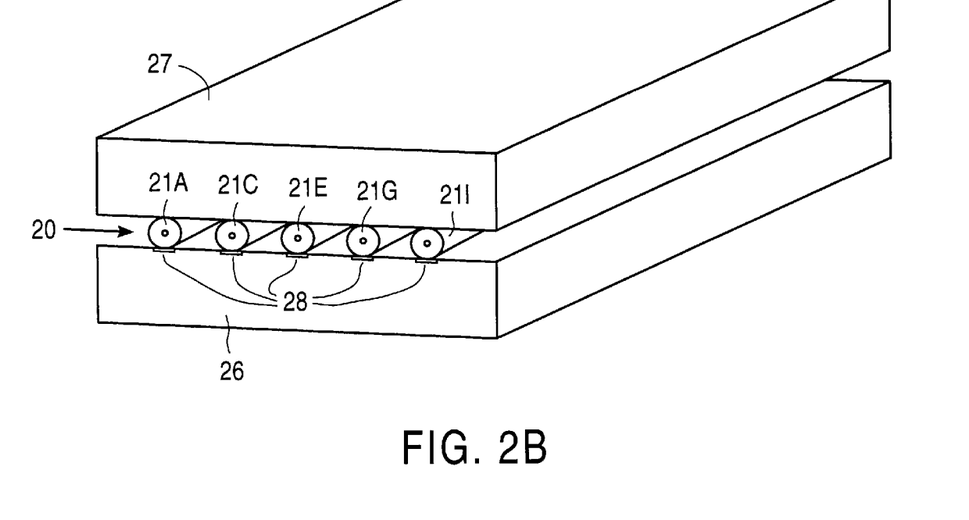
FIG. 2B is a perspective drawing of the FIG. 2A output fiber array with grooves in one of the plates.

The output fibers 21A–21I are spaced 125 $\mu$m apart between the glass plates 26 and 27 of FIG. 2A. Alternatively, equally spaced grooves may be etched into the surface of one or more of the glass plates 26 and 27 for more secure positions for each of the output fibers 21A, 21C, 21E, 21G and 21I, as shown in FIG. 2B. The input and alignment fibers 11 and 10 must be accordingly spaced. Note that the pitch of the array 20 is now set by the spacing of the grooves 28. Etching can be performed by standard semiconductor techniques. Instead of glass plates, the natural crystalline orientation of semiconductor substrates may be used to create the grooves to hold the output fibers of the array 20.

Figure 4A:
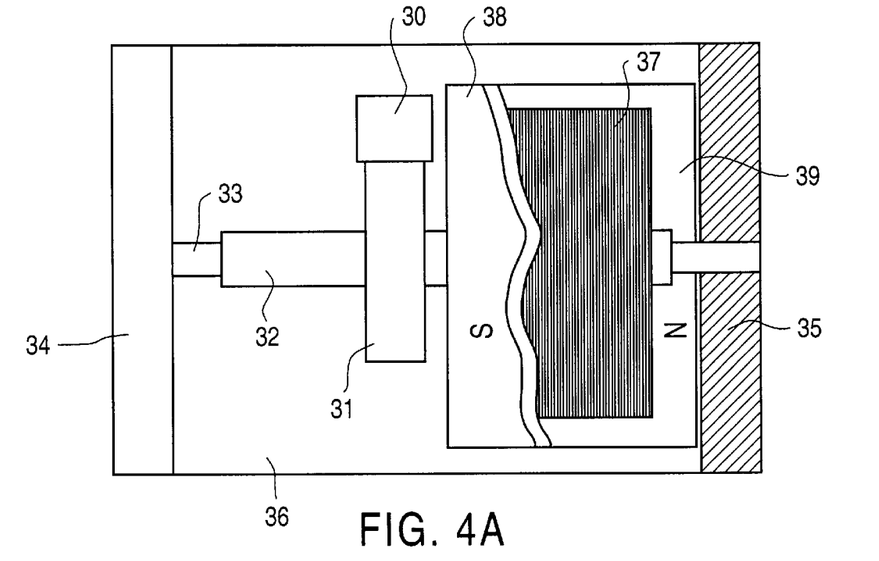
FIG. 4A is a representational top view of the optical switch according to the present invention.
Figure 4B:
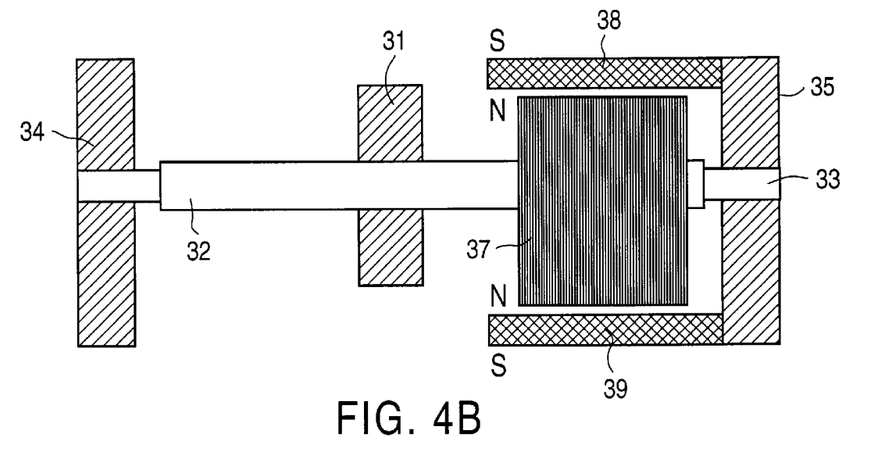
FIG. 4B is a representational side view of FIG. 4A.

To move the input fiber 11 and alignment fiber 10 with respect to the fiber array 20, the optical switch uses an electromechanical actuator system as drawn representationally in FIGS. 4A and 4B. FIG. 4A is a top and partially cross-sectional view of the optical switch. The switch has a base 36 upon which is mounted a stage 30 for the output fiber array 20 (not shown). A second stage 31, which moves relative to the output fiber array stage 30, holds the input fiber 11 and aligning fiber 10. The stage 31 is fixed to a glass tube 32 which moves along a steel rod 33 held at its two ends by steel supports 34 and 35 which, in turn, are fixed to the steel base 36. The input fiber stage 31 makes a sliding contact with the output fiber stage 30, which prevents rotation of the stage 31 and glass tube 32 about the rod 33, yet allows movement of the glass tube 32 along the rod 33. The glass tube 32 is also fixed to a rectangular ceramic base 47 (shown in subsequent drawings) around which are wrapped coils 37 of copper wire. The coils 37 ride between permanent magnets 38, 39 which are fixed to the top and bottom of the support 35. Wire of 0.08 mm diameter and wrapped in 300 turns works effectively.

Not shown in FIGS. 4A and 4B is a spring (shown in subsequent drawings) which biases the glass tube 32, stage 31 and coils 37 in one direction. When an electric current passes through the coils 37, the force generated by the interaction of the electric current and the magnetic field of the magnets 38, 39 moves the glass tube 32 and input stage 31 against the spring for the alignment of the input fiber 11 (and alignment fiber 10) with the array 20 of output fibers 21A–21I.

Figure 5:
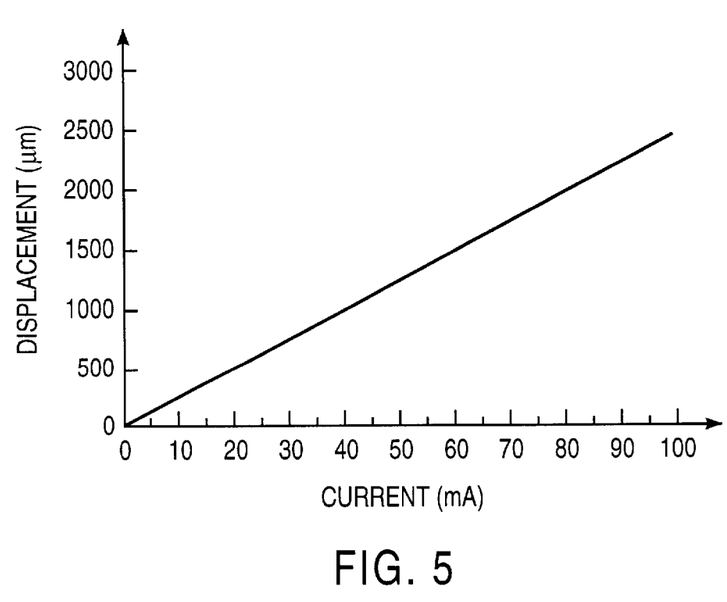
FIG. 5 is a plot of displacement versus electric current for coarse alignment of the input fiber with a selected output fiber for the optical switch of FIGS. 4A–4B.

As might be expected from Hook's law, the displacement of the input fiber stage 31 is proportional to the amount of current through the coils. FIG. 5 illustrates the displacement of the input fiber stage 31 corresponding to the amount of current through the coils 37 for one set of parameters. The displacement is approximately 250 $\mu$m per each 10 mA increase in current. The range of displacement ranges from 0–3000 $\mu$m, which permits 24 (3000 $\mu$m/125 $\mu$m) output fibers to be placed in the array 20. The total width of this array for a 1×23 (=24−1) optical switch is 3 mm, very suitable for the miniaturization of the optical switch.

Figure 6:
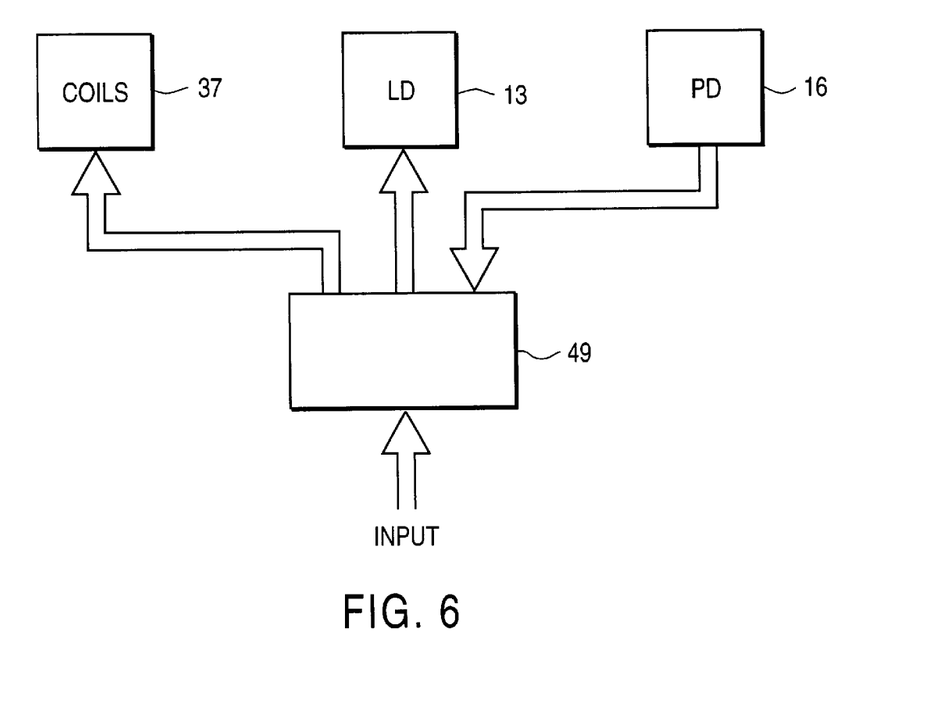
FIG. 6 illustrates the connections of a controller for coarse and fine alignment of the input fiber with a selected output fiber for the optical switch of FIGS. 4A–4B.

To select one of the output fibers of the array 20, an input signal is sent to a controller 49, which can be easily designed by electronic designers. A standard design, for example, incorporates a microcontroller or a microprocessor. The controller 49 is connected to the coils 37 of the electromechanical actuator, the light emitting diode 13 of the light source 12 (FIG. 1) as a power supply, and the photodetector 16 of the light receiver, as illustrated in FIG. 6. After calibration and reliance upon the relationship illustrated by FIG. 5, the controller 49 sends a predetermined amount of current to the coils 37 sufficient to move the input fiber 11 for a coarse alignment between the input fiber 11 and the selected output fiber. Alignment error is less than 10 $\mu$m. To complete the alignment between the input fiber 11 and the selected output fiber, the controller 49 uses the feedback relationship between the displacement and the amount of light received by the photodetector 16. When the input fiber 11 and the selected output fiber of the array 10 are truly aligned, the amount of reflected light is a minimum and the signal from the photodetector 16 is a minimum.

An alternative embodiment for the fine alignment uses capacitive coupling which is dependent upon the relative position between the input fiber 11 and the output fibers of the array 20. FIGS. 7A–7D show more details of the actuator of the optical switch, particularly adapted for fine alignment using capacitive coupling. It should be evident that some of elements are also common to the actuator of the optical switch using the optical feedback discussed above for the fine adjustment.

Figure 7A:
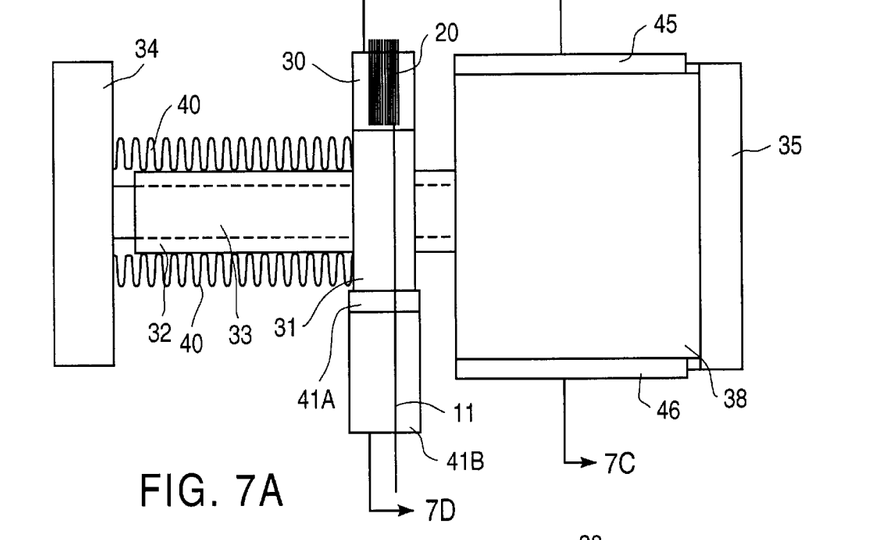
FIG. 7A is a more detailed top view of the optical switch as shown in FIG. 4A.

The top view of FIG. 7A shows the alignment of the array 20 on the output fiber stage 30 and the input fiber 11 on the stage 31. A spring 40, a beryllium-copper alloy bellow spring, biases the stage 31 with respect to the support 34. The particular alloy resists fatigue very well. Other types of springs, such as a coil spring, might also be used. Opposite the array stage 30, one portion 41A of a sandwich-type capacitor 41 is fixed to the input fiber stage 31. The other portion 41B of the capacitor is fixed to the base 36 of the optical switch. The capacitor 41 is used to monitor the position of the input fiber stage 31 relative to the output fiber array stage 30.

Figure 7B:
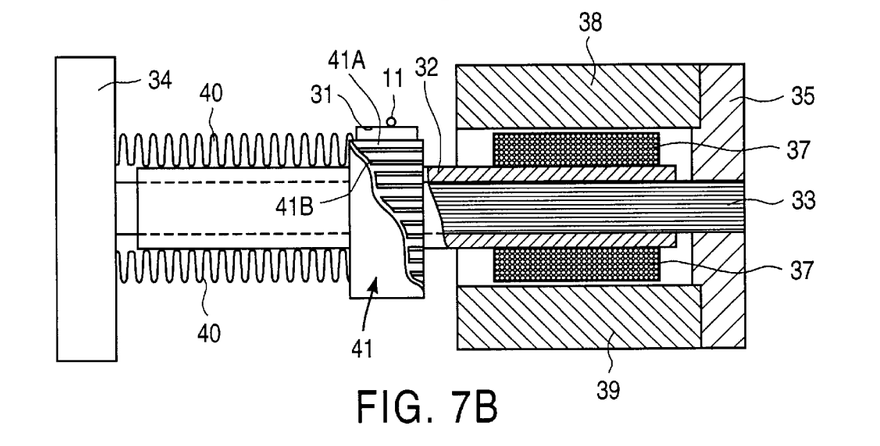
FIG. 7B is a more detailed side view of FIG. 4B.

A side and partial cross-sectional view in FIG. 7B shows the input fiber 11 upon the top of the stage 31 with a cross-sectional view of the coils 37 between the two permanent magnets 38 and 39. The alignment fiber 10 alongside the input fiber 11 is not shown, since it is not needed for fine alignment in this embodiment.

Figure 7C:
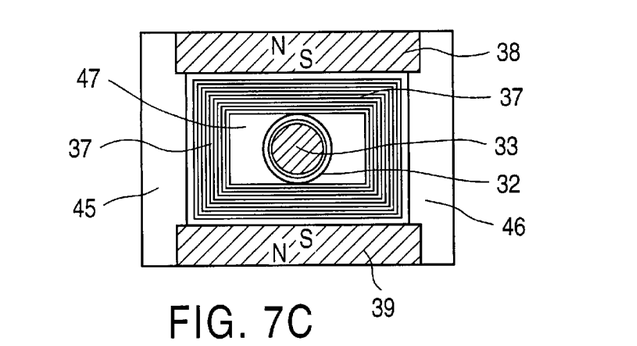
FIG. 7C is a detailed side view of the coils and magnets in FIG. 7A and 7B.

FIG. 7C shows a cross-section of the optical switch along line 7C–7C' in FIG. 7A. The drawing illustrates the two permanent magnets 38 and 39, which are partially held in place by magnet supports 45 and 46. The combination of electric coils 37 and magnets 45, 46 as an actuator to move the input fiber stage 31 with respect to the array stage 30 allows the optical switch to be miniaturized. The size of the described optical switch is no more than 8 cm long by 5 cm wide by 4 cm deep, for example. This allows for the easy hermetic sealing and installation of the optical switch. Being constructed of miniaturized elements, the optical switch is less subject to inertial shock as compared to a switch with heavier elements.

Figure 7D:
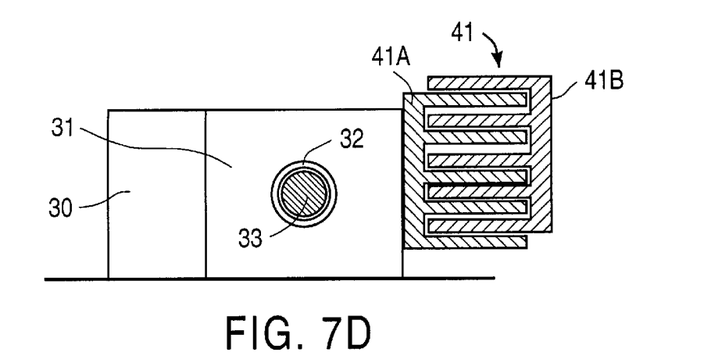
FIG. 7D is a detailed cross-sectional view of the position-monitoring capacitor in FIG. 7A.

FIG. 7D, a cross-sectional view along line 7D–7D' in FIG. 7A shows the capacitor 41 in greater detail. The portions 41A and 41B are interdigitated capacitive plates. One portion 41A moves with the input fiber stage 31, while the other portion 41B is fixed with the array stage 30 to the base 36. As the glass tube 32 moves along the rod 33, the capacitance changes between the two portions 41A and 41B. This allows monitoring of the position of the input fiber stage 31. For example, if the electric charge on the two portions 41A and 41B is kept constant, the change in voltage between the two portions 41A and 41B varies inversely with the change in capacitance as the input fiber stage 31 is moved. This capacitive coupling between the two portions 41A and 41B is used for the fine alignment between the input fiber 11 and the selected output fiber of the array 20. In this embodiment the controller 49 is connected to the coils 37 as before and to the capacitor portions 41A and 41B. The controller uses a predetermined amount of current to the coils 37 to move the input fiber stage 31 for the coarse alignment of the input fiber 11 and the selected output fiber, as described above. The feedback signals from the capacitor 41 determines the fine alignment of the input fiber stage 31 respectively. For example, the signals from the capacitor 41 are used to move the input optical fiber 11 to a selected output optical fiber 21A–21I and the signals from the photodetector 16 control the alignment of the cores of the input optical fiber 11 and the selected output optical fiber.

As described above, the actuator permits control over extremely small movements of the input fiber 11 necessary for alignment with the output fibers of the array 20. For example, the array 20 of FIG. 2 has a pitch of 125 $\mu$m. With the parameters set for the spring 40 and the coils 37, such controlled movements are easily possible. In fact, since the optical switch has such fine control over the input fiber stage 31, the input optical fiber 11 can be operated as a variable attenuator. Controlled fractions of the input signal intensity can be sent down a selected output optical fiber by partial alignment of the input optical fiber 11 and the selected output optical fiber 21A–21I.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A electromechanical optical switch comprising
   an array of first optical fibers, each having an end section in fixed spatial relationship with other end sections of said first optical fibers;

a second optical fiber having an end section;

an actuator effecting a relative movement of said second optical fiber with respect to said first optical fibers for an alignment of said end section of said second optical fiber with an end section of any one of said first optical fibers to form an optical path between said second optical fiber and said one first optical fiber; and an alignment controller controlling said relative movement by said actuator through an electric current amount, an amount of said relative movement directly proportional to said electric current amount, said alignment controller effecting a coarse alignment between said second optical fiber and a selected first optical fiber dependent upon said proportionality between said relative movement amount and said electric current amount.

2. The electromechanical optical switch of claim 1 wherein said alignment controller effects a fine alignment between said second optical fiber and any selected first optical fiber responsive to a feedback signal dependent upon alignment of said end section of said second optical fiber with an end section of said selected first optical fiber.

3. The electromechanical optical switch of claim 2 further comprising a third optical fiber having an end section, said end section of said third optical fiber in fixed spatial relationship with said end section of said second optical fiber such that an alignment of said end section of said third optical fiber with an end section of a first optical fiber aligns said end section of said second optical fiber with an end section of said selected first optical fiber;

a light source connected to said third input optical fiber for transmitting light signals through said third input optical fiber; and a detector connected to said third input optical fiber for receiving light signals reflected back into said third input optical fiber, said detector generating said feedback signal responsive to said reflected light signals.

4. The electromechanical optical switch of claim 2 further comprising a first set of parallel conductive plates fixed relative to said array of said first optical fibers;

a second set of parallel conductive plates fixed relative to said second optical fiber and interdigitated with respect to said first set of conductive plates, said actuator effecting a relative movement between said first and second sets of conductive plates as said actuator effects said relative movement of said second optical fiber with respect to said first optical fibers;

a detector connected to said first and second sets of conductive plates, said detector generating said feedback signal responsive to a capacitive coupling responsive to a relative position between said first and second sets of conductive plates.

5. The electromechanical optical switch of claim 1 wherein said end sections of said first optical fibers are parallel to each other.

6. The electromechanical optical switch of claim 5 wherein said end sections of said first optical fibers are contiguous to each other.

7. The electromechanical optical switch of claim 1 wherein said actuator comprises an electromagnet fixed with respect to either said first optical fiber array or said second optical fiber;

a permanent magnet fixed with respect to the other of said first optical fiber array or said second optical fiber; and a spring having a first end fixed with respect to either said first optical fiber array or said second optical fiber, and a second end fixed with respect to the other of said first optical fiber array or said second optical fiber, said spring arranged so that an electromagnetic force generated between said electromagnet and said permanent magnet works against said spring.

8. A electromechanical optical switch comprising an array of first optical fibers, each having an end section in fixed spatial relationship with other end sections of said first optical fibers;

a second optical fiber having an end section;

a third optical fiber having an end section, said end section of said third optical fiber in fixed spatial relationship with said end section of said second optical fiber such that an alignment of said end section of said third optical fiber with an end section of one of said first optical fiber aligns said end section of said second optical fiber with an end section of another first optical fiber to form an optical path between said second optical fiber and said another first optical fiber;

a light source connected to said third optical fiber for transmitting light signals through third optical fiber;

a detector connected to said third optical fiber for receiving said light signals reflected back into said third optical fiber; and an actuator for effecting a relative movement of said third optical fiber with respect to said first optical fiber array to align said end section of said third optical fiber with an end section of one of said first optical fibers responsive to said detector;

whereby transmission and reflection of optical signals through said third optical fiber with respect to said first optical fibers controls alignment of said second optical fiber with said first optical fibers.

9. The electromechanical optical switch of claim 8 wherein said first optical fibers have said end sections aligned parallel to each other in said array, each first optical fiber having a core and a cladding surrounding said core, said array of first optical fibers having a pitch determined by a diameter of said optical fiber cladding.

10. The electromechanical optical switch of claim 8 wherein each first optical fiber has a core and cladding and each end section of said first optical fiber terminates in an end surface intersecting said core and cladding, said end surface intersecting said cladding covered by material having a high reflectivity.

11. The electromechanical optical switch of claim 10 wherein said end surface of each first optical fiber intersecting said core is covered by anti-reflection material.

12. The electromechanical optical switch of claim 8 wherein said actuator comprises at least one permanent magnet fixed with respect to either said first optical fiber array or said second optical fiber;

an electromagnet fixed with respect to the other of said first optical fiber array or said second optical fiber so that a force created between said permanent magnet and said electromagnet responsive to electric current passing through said electromagnet effects relative movement between said first optical fiber array and said second optical fiber.

13. The electromechanical optical switch of claim 12 wherein said actuator further comprises a spring having a first end fixed with respect to either said first optical fiber array or said second optical fiber and a second end fixed with respect to the other of said first optical fiber array or said second optical fiber, said spring arranged so that said force between said permanent magnet and said electromagnet operates against said spring.

14. The electromechanical optical switch of claim 8 wherein said end sections of said first optical fibers have ends aligned with each other ends, said end sections spaced a predetermined distance from each other and forming a plane;

said end sections of said second and third optical fibers having ends facing said ends of said first optical fibers and displaced said predetermined distance from each other; and said actuator moving said end sections of said second and third optical fibers with respect to said end sections of said first optical fibers in said plane responsive to optical signals passing between said third optical fiber and said first optical fibers for alignment of said second optical fiber with a selected first optical fiber.

15. An electromechanical optical switch comprising an array of first optical fibers, each having an end section in fixed spatial relationship with other end sections of said first optical fibers;

a first set of parallel conductive plates fixed with respect to said array of first optical fibers;

a second optical fiber having an end section, said end section having a movable relationship to said end sections of said first optical fibers capable of alignment with each of said end sections of said first optical fibers;

a second set of parallel conductive plates fixed with respect to said second optical fiber and interdigitated with respect to said first set of conductive plates;

an actuator for effecting a relative movement of said second optical fiber and said second set of conductive plates with respect to said first optical fiber array and said first set of conductive plates; and a detector connected to said first and second sets of conductive plates for generating a signal to said actuator, said signal corresponding to a capacitive coupling and a relative position between said first and second sets of conductive plates to align said end section of said second optical fiber with an end section of a selected one of said first optical fibers.

16. The electromechanical optical switch of claim 15 wherein said first optical fibers have said end sections aligned parallel to each other in said array, each first optical fiber having a core and a cladding surrounding said core, said array of first optical fibers having a pitch determined by a diameter of said optical fiber cladding.

17. The electromechanical optical switch of claim 15 wherein said actuator comprises at least one permanent magnet fixed with respect to either said first optical fiber array or said second optical fiber; and an electromagnet fixed with respect to the other of said first optical fiber array or said second optical fiber so that a force created between said permanent magnet and said electromagnet responsive to electric current passing through said electromagnet effects relative movement between said first optical fiber array and said second optical fiber.

18. The electromechanical optical switch of claim 17 wherein said actuator further comprises a spring having a first end fixed with respect to either said first optical fiber array or said second optical fiber and a second end fixed with respect to the other of said first optical fiber array or said second optical fiber, said spring arranged so that said force between said permanent magnet and said electromagnet operates against said spring.

19. The electromechanical optical switch of claim 15 wherein said end sections of said first optical fibers have ends aligned with each other ends, said end sections spaced a predetermined distance from each other and forming a plane;

said end section of said second optical fiber having an end facing said ends of said first optical fibers; and said actuator moving said end section of said second optical fiber with respect to said end sections of said first optical fibers in said plane responsive to said actuator signal for alignment of said second optical fiber with a selected first optical fiber.

* * * * *